Figure 1:
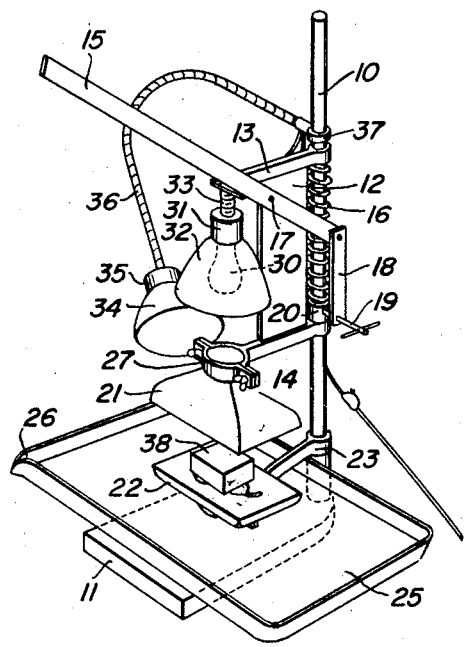

April 29, 1958 — L. L. FARR — 2,832,299
APPARATUS FOR MOLDING ICE CREAM
Filed Sept. 2, 1955

INVENTOR:
LEWIS L. FARR,
BY
ATTORNEYS.

United States Patent Office 2,832,299
Patented Apr. 29, 1958

2,832,299

APPARATUS FOR MOLDING ICE CREAM

Lewis L. Farr, Salt Lake City, Utah

Application September 2, 1955, Serial No. 532,135

3 Claims. (Cl. 107—15)

This invention relates to the production of various sculpture-resembling individual figures and shapes of ice cream as commonly served at parties and special occasions, and is concerned with the provision of a new and improved apparatus for the purpose.

Usual practice in the production of molded representations of fruits, flowers, and a wide variety of other sculptured objects from ice cream is to introduce soft, incompletely frozen ice cream into two-part molds, which are manually closed and placed on dry ice for freezing the contents hard.

While there are many large-scale producers of ice cream products, there are many more relatively small, localized producers. The former do often produce and market individual, molded shapes of ice cream, for example, shapes mass produced and sold in individual plastic molds for removal therefrom by the consumer, but party orders for individually molded shapes are still to a large extent placed with smaller, localized producers and represent a worthwhile phase of their business.

The filling of such special orders for individual shapes is a time consuming procedure as normally practiced. At slack periods, no difficulty is experienced. Yet, more likely than not it happens that special orders are received when little time can be spared from the normal work of the establishment, and it is not uncommon for so many special orders to be received at the same time for immediate filling that a real problem confronts the producer.

A principal purpose of the present invention is to provide improved apparatus for molding ice cream into special shapes, whereby production is greatly speeded up, less manual labor is required, the resulting shapes are as clean-cut and attractive in appearance as when the greatest of care is employed with the customary hand molds, the equipment stands ready at all times for immediate use employing ice cream from regular stock, significantly less ice cream is required to produce a given shape, and the over-all cost of production is considerably reduced as compared with conventional methods.

A feature of my invention resides in the fact that hard-frozen ice cream is employed, rather than the soft, partially frozen ice cream customarily used heretofore. So far as the apparatus is concerned, a principal feature resides in the provision of a multi-part mold, with means for forcibly pressing the parts tightly together about a charge of hard-frozen ice cream introduced thereinto, and with means for maintaining the mold parts at a temperature above that at which the ice cream remains frozen.

Further objects and features of the invention will become apparent from the following detailed description considered with reference to the accompanying drawing, which illustrates a presently preferred form of apparatus for carrying out the invention.

Figure 2:
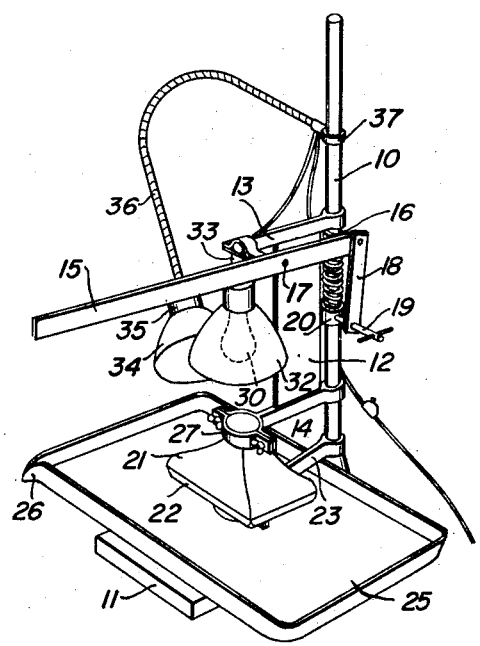
Figure 4:
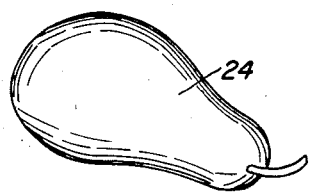
Figure 3:
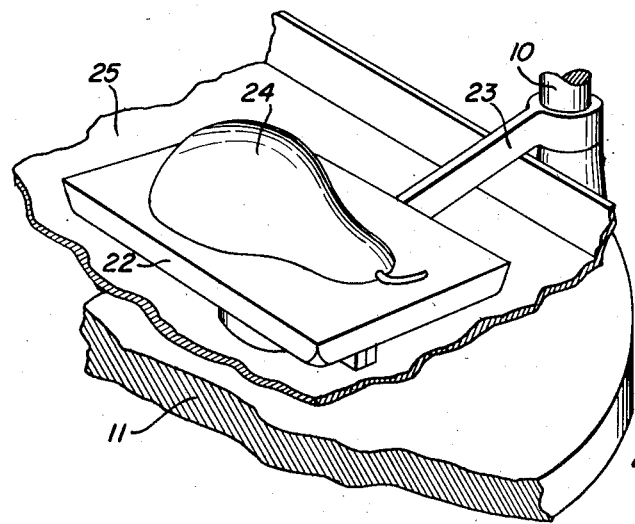

In the drawing:

Fig. 1 represents a perspective view of the apparatus, with the parts of the mold separated and a charge of hard-frozen ice cream in position to be molded;

Fig. 2, a corresponding view, but showing the mold parts pressed together about the charge of ice cream;

Fig. 3, a fragmentary view in perspective corresponding to the lower portion of Fig. 1, and illustrating the completely molded shape of ice cream following separation of the mold parts; and Fig. 4, a perspective view of the molded shape of ice cream following its removal from the mold and the application thereto of a liquid spray.

Referring to the drawing:

The illustrated form of the apparatus of the invention is a manually operated, single mold press, the mold of which is made up of two parts radiantly heated by adjustably positioned, electric lamps. While this form of apparatus is presently preferred by reason of ease of assembly from readily obtainable components, it should be realized that the essential features of the invention may be provided by a variety of different types of construction.

As illustrated, the apparatus embodies press mechanism taken from or manufactured in accordance with standard drill press construction. As such, it comprises a standard 10 rising from fixed securement to a supporting base 11. A press carriage 12, having forwardly extending upper and lower bracket arms 13 and 14, is slideably mounted on the standard 10 for down and up movement, effected by means of a manually operated handle 15 and a return spring 16, respectively.

Handle 15 is pivoted intermediate its length to carriage 12 by means of a pivot pin 17, and is fulcrumed with respect to standard 10 by a link 18 connected to the set screw portion 19 of an anchor ring 20. The down or pressure stroke of the press gains adequate mechanical advantage for the pressure molding of hard-frozen ice cream by reason of such lever arrangement, which, in and of itself, is conventional.

The mold parts are advantageously removable and replaceable with respect to the press, so that the same press may be utilized for producing a variety of different individual shapes of ice cream. In the present instance, the mold includes an upper part 21, which is removably secured in operating position on carriage 12 by means of a collar clamp 27 at the forward end of the lower bracket arm 14. It also includes a lower part 22, which is similarly secured at the forward end of a bracket arm 23. Both the mold parts in this instance have concavities adapted to co-operate in the molding of a single shape 24 of ice cream having the form of a piece of fruit, specifically, a pear.

A tray 25 is removably interposed between the base 11 of the press and the bracket arm 23, so as to catch any exudate from the mold during operation of the apparatus. By providing such tray with a spout 26 leading to a suitable receptacle (not shown) for collecting the exudate, the molding operations may be continued without interruption.

As so constructed, the mold parts and the tray may be easily removed for washing at the termination of any working period.

It is a feature of the invention that the mold is heated during the molding operation to a temperature slightly above the melt point of the ice cream, so as to facilitate the molding operation, insure filling of all the crevices of the mold, and enable removal of the molded shape without damage thereto. For this purpose, a heating device is associated with the press, and means are provided for controlling the quantity of heat applied to the mold.

While various radiant heating devices may be utilized for the purpose, I have found that an economical, highly effective, and easily controlled arrangement is provided by an electric lamp of either lighting or heating type, which is preferably adjustably positionable so as to direct its radiation toward and upon the respective mold parts.

Thus, an ordinary light bulb 30 supplied with electricity from a screw-in socket 31 and surrounded by a reflector 32 has its heat energy directed radiantly against the upper external surface of the upper mold part 21, thereby furnishing both light and heat for the operation. Such assembly is mounted at the forward end of the upper bracket 13 of carriage 12 by means of a suspension member 33, and can be controlled in its heat-imparting relationship to the mold part 21 by changing the bulb to one of greater or less wattage.

A second assembly made up of an infrared heat lamp 34 screwed into an electrical socket 35 at one end of a flexible conduit 36 advantageously has its heat energy directed upon both upper and lower mold parts. The other end of conduit 36 is adjustably mounted on standard 10 by means of ring 37. Thus, such heat lamp can be directed as desired, heating either or both of the mold parts at the discretion of the operator.

The choice of electric lamps and mountings here shown is a convenient one, but does not represent an arrangement which is critical so far as results are concerned. A variety of other arrangements may be utilized.

In employing the illustrated apparatus to carry out the method of the invention, a charge 38 of hard-frozen ice cream is introduced into the mold by placing it in the cavity of the lower mold part 22. Such charge is predetermined to an approximate extent, so far as quantity is concerned, to accord with the known volumetric characteristics of the particular mold, thereby reducing exudate to a minimum while insuring filling of the mold cavity.

Following the introduction of the charge 38, the handle 15 of the press is manually forced down to lower and tightly press the upper mold part against the lower. Even though the charge of ice cream is hard-frozen, little difficulty will be experienced in the molding operation, because of the mechanical advantage afforded by the press. Moreover, the molding operation is an exceedingly rapid one.

The mold parts are heated before and during the molding operation to a temperature slightly above the melting point of the ice cream. This means that a film of melted ice cream is produced between the molded body of ice cream and the interior mold surfaces.

The quantity of heat imparted to the mold parts is conveniently controlled by observation. It will be found that, for any given mold, an appropriate positional setting of the lamp 34 is easily established at the commencement of any given run. The exact temperature is not critical. Considerable leeway is possible as a practical matter.

As a guide to the procedure, it should be realized that the temperature of hard-frozen ice cream going into the mold will range from approximately −10° to +5° Fahrenheit, and that it is desirable to maintain a temperature at the contact surfaces of the mold of approximately 15° Fahrenheit or higher. The optimum temperature of the cold frozen ice cream introduced into the mold is approximately 0° Fahrenheit for most satisfactory results.

In this connection, it is noted that standard, packaged bricks of ice cream may be taken directly from storage maintained at the appropriate temperature and sliced into pieces of proper size for charging the mold. This makes it possible for small operators to be constantly ready to turn out individual molded shapes at a minimum of inconvenience and expense.

The rapidity with which molded shapes are turned out will, to a large extent, determine whether lamp 34 is positioned closer to or further from the mold parts and whether a bulb of greater or less wattage is used in socket 31.

Cast aluminum is an ideal material for the molds, because of the ease and inexpensiveness of producing mold parts therefrom and of the rapid conduction of heat from exterior to interior thereof. While single cavity mold parts are shown, it is obvious that the character of the mold parts may be varied widely for the production of many different varieties of molded ice cream shapes.

Following removal from the mold of the completely molded shape 24, Fig. 4, such shape is advantageously treated by applying to its surface a very fine spray of water, either plain or colored, by means of an atomizer. While it is common practice to dip molded ice cream shapes in water following their removal from molds, I know of no instance where spraying is practiced as here disclosed.

The shape is covered with a thin coating of melted ice cream immediately following its removal from the mold. The spray tends to spread and smooth this coating immediately prior to its hardening and glazing by reason of the low temperature of the body of the shape.

Whereas this invention is here illustrated and described with respect to specific embodiments thereof, it should be realized that changes may be made within the scope of the following claims, without departing from the essential contributions which I have made to the art.

I claim:

1. Apparatus for producing individual, sculpture shapes of ice cream, comprising a multi-part, sculpture mold; means for bringing the parts of the mold into closed, pressure-holding relationship about a charge of hard-frozen ice cream; means for retracting at least one of said parts relative to the other or others so as to open the mold following pressure-molding of a sculpture shape from said charge of ice cream; radiant heating means disposed exteriorly of but directed in heat-imparting relationship toward all parts of said mold, said radiant heating means being spaced apart from said parts of the mold in heat-imparting proximity thereto; reflector means associated with said radiant heating means in position to concentrate the radiant heat energy therefrom and direct it upon said mold parts; and means for adjusting the quantity of heat imparted to said mold parts.

2. The apparatus of claim 1, wherein the means for bringing the parts of the mold into closed, pressure-molding relationship comprise a standard, and press mechanism attaching the mold parts to said standard; and wherein the radiant heating means comprise an electric bulb and socket assembly, said assembly and the reflector means being mounted on said standard.

3. The apparatus of claim 2, wherein the radiant heating means comprise an electric bulb and socket assembly adjustably mounted with its reflector means on the standard to radiate heat on part of the mold and a second electric bulb and socket assembly adjustably mounted with its reflector means on the standard to radiate heat on another part of the mold.

References Cited in the file of this patent
UNITED STATES PATENTS

| | | |
|---|---|---|
| 948,969 | Dickson | Feb. 8, 1910 |
| 2,260,689 | Miller | Oct. 28, 1941 |
| 2,373,781 | Richardson | Apr. 17, 1945 |
| 2,579,696 | Perlman | Dec. 25, 1951 |
| 2,625,120 | Eddy et al. | Jan. 13, 1953 |
| 2,638,064 | Murphy | May 12, 1953 |
| 2,703,538 | Sedduto | Mar. 8, 1955 |